(12) United States Patent
Fleming et al.

(10) Patent No.: US 12,297,677 B2
(45) Date of Patent: May 13, 2025

(54) REDUCED VOLUME LATCH, LOCK, VENT AND HANDLE MECHANISM FOR AN APPARATUS DOOR

(71) Applicant: The Boeing Company, Chicago, IL (US)

(72) Inventors: Michael Anthony Fleming, Bellevue, WA (US); David Hummer, Everett, WA (US)

(73) Assignee: The Boeing Company, Chicago, IL (US)

( * ) Notice: Subject to any disclaimer, the term of this patent is extended or adjusted under 35 U.S.C. 154(b) by 148 days.

(21) Appl. No.: 18/145,429

(22) Filed: Dec. 22, 2022

(65) Prior Publication Data

US 2024/0209663 A1 Jun. 27, 2024

(51) Int. Cl.
| | | |
|---|---|---|
| *E05C 1/00* | (2006.01) | |
| *B64C 1/00* | (2006.01) | |
| *B64C 1/14* | (2006.01) | |
| *E05C 1/06* | (2006.01) | |

(52) U.S. Cl.
CPC ............... *E05C 1/004* (2013.01); *E05C 1/06* (2013.01); *B64C 2001/009* (2013.01); *B64C 1/1407* (2013.01)

(58) Field of Classification Search
CPC ...... B64C 1/1407; B64C 1/1423; B64C 1/143
See application file for complete search history.

(56) References Cited

U.S. PATENT DOCUMENTS

| | | |
|---|---|---|
| 4,473,201 A | 9/1984 | Barnes et al. |
| 5,305,969 A | 4/1994 | Odell et al. |
| 5,337,977 A * | 8/1994 | Fleming ................. B64C 1/143 |
| | | D12/345 |
| 5,823,473 A | 10/1998 | Odell et al. |
| 5,931,415 A | 8/1999 | Lingard et al. |
| 6,454,210 B1 | 9/2002 | Plattner |

(Continued)

FOREIGN PATENT DOCUMENTS

| | | |
|---|---|---|
| CN | 1082003 C | 4/2002 |
| FR | 2686568 A1 | 7/1993 |

(Continued)

OTHER PUBLICATIONS

Extended European Search Report, Application No. 23212497.4, Dated Jun. 6, 2024, Five Pages.

*Primary Examiner* — Philip J Bonzell
*Assistant Examiner* — Eric Acosta
(74) *Attorney, Agent, or Firm* — Joseph M. Butscher; The Small Patent Law Group LLC (57) ABSTRACT

Systems, apparatuses, and methods provide for technology that moves a vent panel into a pressurization position to close a depressurization vent to allow an apparatus to be pressurized. In the pressurization position, a first protrusion abuts a door structure. The vent panel is coupled with the first protrusion. The technology moves the vent panel to a depressurization position to open the depressurization vent to depressurize the apparatus. In the depressurization position the first protrusion is separated from the door structure. The technology moves the vent panel to an intermediate position between the pressurization position and the depressurization position. In the intermediate position the first protrusion abuts the door structure.

20 Claims, 10 Drawing Sheets

(56) References Cited

U.S. PATENT DOCUMENTS

| | | |
|---|---|---|
| 8,201,777 B2 | 6/2012 | Wilson et al. |
| 8,298,055 B2 | 10/2012 | Schiek |
| 8,991,761 B2 | 3/2015 | Pritzen et al. |
| 10,752,331 B2 | 8/2020 | Bessettes et al. |
| 2006/0006285 A1 | 1/2006 | Puschmann et al. |
| 2011/0049299 A1 | 3/2011 | Gowing et al. |
| 2013/0327892 A1 | 12/2013 | Gowing et al. |
| 2019/0063116 A1 | 2/2019 | Zou |
| 2022/0126974 A1 | 4/2022 | Louvel et al. |
| 2022/0135201 A1 | 5/2022 | Mortland |

FOREIGN PATENT DOCUMENTS

| | | |
|---|---|---|
| FR | 3043059 B1 | 12/2018 |
| WO | 2020182766 A1 | 9/2020 |
| WO | 2021165896 A1 | 8/2021 |

\* cited by examiner

REDUCED VOLUME LATCH, LOCK, VENT AND HANDLE MECHANISM FOR AN APPARATUS DOOR

FIELD

Examples generally relate to a venting system which prevents pressurizing an aircraft cabin when the door is not properly closed, latched, and locked. More particularly examples relate to a reduced volume latching, locking, pressure prevention, and handle mechanism that is able to fit in smaller aircraft doors.

BACKGROUND

An aircraft cabin can be pressurized during operation. Cabin pressurization may offset differences between low-altitude and high-altitude air density. That is, air is less dense at high altitudes than at low altitudes, resulting in air pressure imbalances between low-altitude and high-altitude. The per square inch (PSI) differences between low-altitude and high-altitude air density can exceed 10 PSI.

Low air pressure associated with high-altitude flights can restrict passengers from receiving an adequate amount of oxygen. Thus aircraft cabins are typically pressurized to ensure that passengers are able to receive the adequate amount of oxygen and prevent unfavorable conditions such as hypoxia. That is, the low air pressure at higher altitudes results in the density of air being less and containing less oxygen. As such, pressurization is required so that the air density increases leading to people receiving sufficient oxygen.

Pressurization systems can maintain comfortable pressurization inside aircrafts despite the range in altitudes of an aircraft. Some pressurization prevention systems occupy a significant amount of space and are therefore difficult to incorporate within the limited space of smaller aircraft doors.

SUMMARY

In accordance with one or more examples, provided is an aircraft. The aircraft includes a door structure. The aircraft also includes a first protrusion that is positionable to abut the door structure. The aircraft also includes a vent panel coupled with the first protrusion, where the vent panel is movable between a pressurization position to close a depressurization vent to allow the aircraft to be pressurized, where in the pressurization position the first protrusion abuts the door structure, a depressurization position to open the depressurization vent to prevent pressurization of the aircraft, where in the depressurization position the first protrusion is separated from the door structure, and an intermediate position between the pressurization position and the depressurization position, where in the intermediate position the first protrusion abuts the door structure.

In an example, a method also includes moving a vent panel into a pressurization position to close a depressurization vent to allow an aircraft to be pressurized, where in the pressurization position a first protrusion abuts a door structure, where the vent panel is coupled with the first protrusion. The method also includes moving the vent panel to a depressurization position to open the depressurization vent to depressurize the aircraft, where in the depressurization position the first protrusion is separated from the door structure. The method also includes moving the vent panel to an intermediate position between the pressurization position and the depressurization position, where in the intermediate position the first protrusion abuts the door structure.

The features, functions, and advantages that have been discussed can be achieved independently in various examples or can be combined in yet other examples further details of which can be seen with reference to the following description and drawings.

BRIEF DESCRIPTION OF THE DRAWINGS

The various advantages of the examples will become apparent to one skilled in the art by reading the following specification and appended claims, and by referencing the following drawings, in which:

DESCRIPTION

Figure 1:
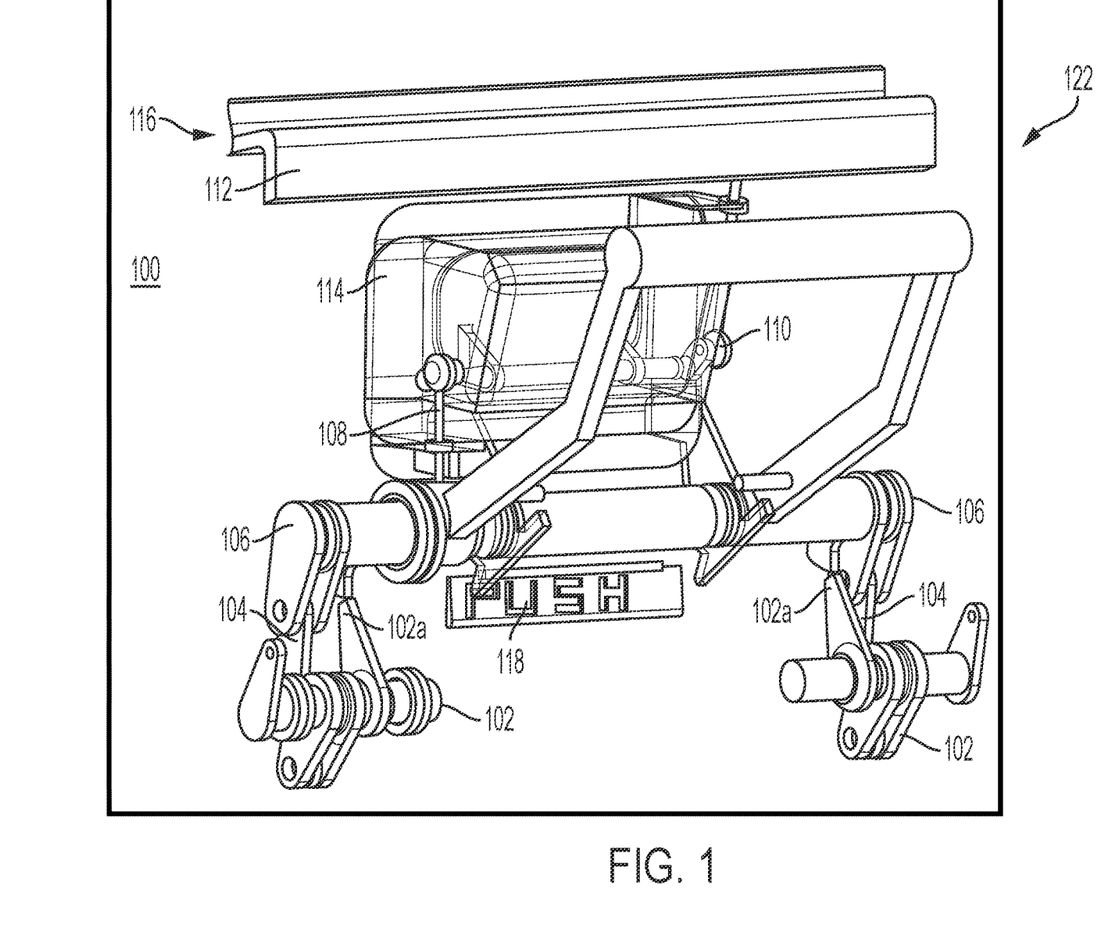
FIG. 1 is an illustration of an example of a latching, locking, venting and handle mechanism of an aircraft door.

Turning now to FIG. 1, an aircraft door 100 of an aircraft 122 is illustrated. Some examples are broadly applicable to any type of apparatus that has pressurized interiors, and is not so limited to aircraft. The aircraft door 100 may be a smaller emergency only exits (e.g., over wing Type III exits), that is significantly smaller than other service or entry doors. As will be described below, despite the smaller size of the aircraft door 100, the aircraft door 100 includes a latching, locking, handle, and pressure prevention system 116. The latching, locking, handle, and pressure prevention system 116 has a reduced volume and configuration to permit the pressure prevention system 116 to be disposed on the aircraft door 100.

In detail, a vent panel 114 is formed and covers a depressurization vent. The vent panel 114 is configured to allow pressurization of the aircraft 122 in a first configuration (when the vent is sealed) and prevent pressurization in a second configuration (when the vent is unsealed) to enhance safety and comply with certain regulations. The vent panel 114 is also pressure locked to prevent opening if the cabin is pressurized. As will be explained below, operation of the pressure prevention system 116 may be executed by a user, and is designed to facilitate ease of use, comply with regulations and have a reduced volume to be disposed within smaller areas.

In the current state as illustrated in FIG. 1, the vent panel 114 is in a closed position (i.e., a pressurization position) to seal the depressurization vent. A portion of the vent panel 114 is connected with the handle 106 such that the vent panel 114 is movable in correspondence with movement of the handle 106. That is, as the handle 106 moves, the vent panel 114 may be driven to move based on the movement of the handle 106. For example, movement of the handle 106 is transferred to the vent panel 114 to move the vent panel 114.

The latching, locking, handle, and pressure prevention system 116 further includes a door structure 112 that overhangs the vent panel 114 and has a width that is greater than a width of the vent panel 114. In some examples, the door structure 112 has a smaller width than vent panel 114. A first protrusion 110 is positionable to abut the door structure 112. As illustrated, the first protrusion 110 abuts the door structure 112 when the vent panel 114 is in the pressurization position.

The first protrusion 110 is connected with the vent panel 114 to guide movement of the vent panel 114. For example, the first protrusion 110 prevents and/or reduces rotation of the first protrusion 110 when the first protrusion 110 abuts the door structure 112. That is, the first protrusion 110 abuts the door structure 112 and cannot rotate beyond the door structure 112. The limited rotational movement of the first protrusion 110 in turn causes the vent panel 114 to have limited rotational movement. The first protrusion 110 is slideable along the door structure 112 and thus is limited in a range of motion (e.g., limited to sliding but not rotational movement) as long as the first protrusion 110 abuts the door structure 112.

The vent panel 114 is connected with the first protrusion 110 in such a way that the movement of the vent panel 114 is correspondingly limited by the movement of the first protrusion 110. For example, the vent panel 114 can have limited and/or no ability to move independently of and/or relative to the first protrusion 110. Thus, as long as the first protrusion 110 abuts the door structure 112, the vent panel 114 is limited to the movements of the first protrusion 110 (e.g., limited to sliding but not rotational movement). Therefore, the vent panel 114 is unable to rotate and is limited to sliding movements along a wall of the aircraft door 100 while the first protrusion 110 contacts the door structure 112. In some examples, the vent panel 114 is configured to slide along a wall surface of the wall, and the first protrusion 110 is configured to abut a door surface of the door structure 112, where the wall surface is parallel to the door surface to ensure that the vent panel 114 slides along the wall.

As such, when the handle 106 is rotated downwardly, a rotational force is applied to the vent panel 114 to move the vent panel 114 from the pressurization position. In the pressurization position the vent panel 114 closes the depressurization vent to allow the aircraft to be pressurized. Further, in the pressurization position the first protrusion 110 abuts the door structure 112. As the handle 106 rotates, the vent panel 114 moves into an intermediate position between a pressurization position and a depressurization position. In the intermediate position the first protrusion 110 abuts the door structure 112.

That is, as the handle 106 is rotated downwardly, the rotational force is applied to the vent panel 114. The first protrusion 110 abuts the door structure 112 to limit movement of the vent panel 114 to a downward, sliding movement against the wall of the aircraft door 100. As the vent panel 114 slides downward through the intermediate position, which may include intermediate positions, the first protrusion 110 also slides downward relative to the door structure 112 and continues to abut the door structure 112 through all of the intermediate positions. The intermediate positions are when the first protrusion 110 abuts the door structure 112 and the vent panel 114 has moved from a fully closed position to a partially open position.

As the handle 106 continues to rotate, the vent panel 114 and the first protrusion 110 will continue to slide downward into the depressurization position to eventually cause the first protrusion 110 to lose contact with the door structure 112. The vent panel 114 may be spring loaded and when the first protrusion 110 loses contact with the door structure 112, the vent panel 114 may be rotated to completely open the depressurization vent. Thus, the first protrusion 110 prevents the vent panel 114 from moving from the intermediate position to the depressurization position when the first protrusion 110 abuts the door structure 112. When the first protrusion 110 moves out of an abutment position (e.g., loses contact with) with the door structure 112, the vent panel 114 is movable from the intermediate position to the depressurization position.

As noted above, the vent panel 114 slides along the wall of the aircraft door 100 for at least part of rotational movement of the handle 106. In order to do so, the vent panel 114 has an axis that has an eccentric rotation relative to an axis of the handle 106 as the vent panel 114 moves from the pressurization position and through the intermediate position(s) towards the depressurization position. Doing so enhances opening of the vent panel 114. For example, a portion of the vent panel 114 forms an exterior wall of the aircraft. The vent panel 114 slides along the wall when moving between the intermediate positions. As the vent panel 114 slides along the wall, debris (e.g., ice) may be separated from the exterior wall formed by the vent panel 114 through the sliding action. Doing so can be more effective than a purely rotational movement by the vent panel 114 as the purely rotational movement can be a burdensome and arduous process to remove debris, and require a significant amount of strength. That is, a sliding motion of the vent panel 114 will shear ice preventing the vent panel 114 from opening.

The handle 106 may be connected to safety latch rotating assembly 102 through links 104. The safety latch rotating assembly 102 rotates with the handle 106 when the handle 106 rotates if the links 104 transfer movement between the safety latch rotating assembly 102 and the handle 106. If the links 104 are broken, the safety latches 102a will prevent the safety latch rotating assembly 102 from rotating. For example, if the links 104 are broken, the safety latches 102a will remain stationary as the handle 106 rotates, and the handle 106 will eventually abut the safety latches 102a causing the handle 106 to stop rotating. The function of the safety latches 102a is to prevent the safety latch rotating assembly 102 from disengaging if link 104 fails.

The pressure prevention system 116 further includes a second protrusion 108 that is movable into a position to abut a portion of the handle 106 when moving an outer handle, such as outer handle flap 304 (FIG. 3) discussed below. As noted, the vent panel 114 is spring loaded to open the depressurization vent when in the depressurization position. When moving the outer handle flap 206 (FIG. 2) discussed below, the vent panel 114 moves inward and away from the depressurization vent, causing the second protrusion 108 to abut the handle 106. The vent panel 114 may be fastened to the second protrusion 108 such that the second protrusion 108 is not movable relative to the vent panel 114. Thus, when the second protrusion 108 abuts the handle 106, the vent panel 114 will cause the handle 106 to rotate, disengaging the safety latch rotating assembly 102.

The latching, locking, handle, and pressure prevention system 116 further includes a vent panel closing interlock 118 that contacts the vent panel 114 and is rotatable from a first position to a second position as the vent panel 114 moves from the intermediate position(s) to the depressurization position. The vent panel closing interlock 118 is rotatable from the second position to the first position when the vent panel 114 is in the depressurization position to lock the vent panel in the depressurization position by abutting the vent panel 114.

FIG. 1 illustrates the pressure prevention system 116 from an interior perspective of the aircraft 122. To open the vent panel 114 from inside the aircraft the handle 106 is pulled down. The vent panel 114 and in some cases a part (e.g., part of a shaft) of the handle 106 feature rotates in an eccentric fashion to pull the vent panel 114 downward. Once the first protrusion 110 clears the door structure 112, the vent panel 114 springs the vent open as described above, and simultaneously a shaft of the handle 106 drives the safety latch rotating assembly 102 via the links 104.

As will be described below, to open the vent panel 114 from outside the aircraft, a user may push an outer handle flap 206 (FIG. 2) of the handle 106 inwards (towards an interior of the aircraft) to rotate the handle 106 and drive the first protrusion 110 down, allowing the vent panel 114 to be pushed inward. The outer handle flap 206 of the handle 106 also drives the handle second protrusion 108 to engage the handle 106. As the vent panel 114 is pushed inward the handle 106, the shaft of the handle 106 rotates, driving the safety latch rotating assembly 102.

Figure 2:
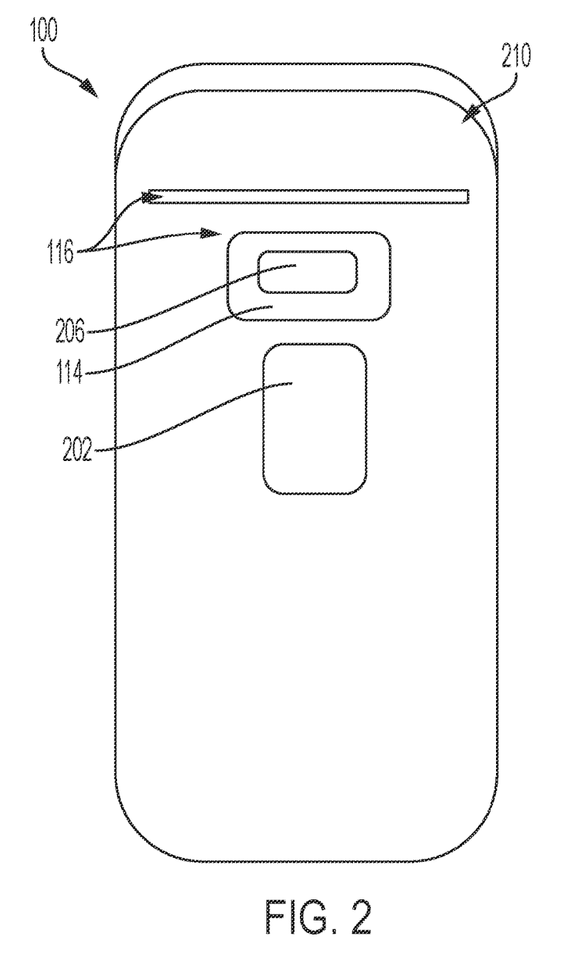
FIG. 2 is an illustration of an example of the aircraft door and other components on the aircraft door.

Turning now to FIG. 2, the aircraft door 100 is illustrated in more detail. The aircraft door 100 includes the latching, locking, handle, and pressure prevention system 116 positioned above a window 202. The outer handle flap 206 integral to the vent panel 114 is illustrated. A door 210 (e.g., wall) of the aircraft is illustrated. The vent panel 114 (FIG. 1) is able to slide relative to the door 210 to remove debris, such as ice, from the vent panel 114 so that the vent panel 114 can rotate away from the door 210.

Figure 3:
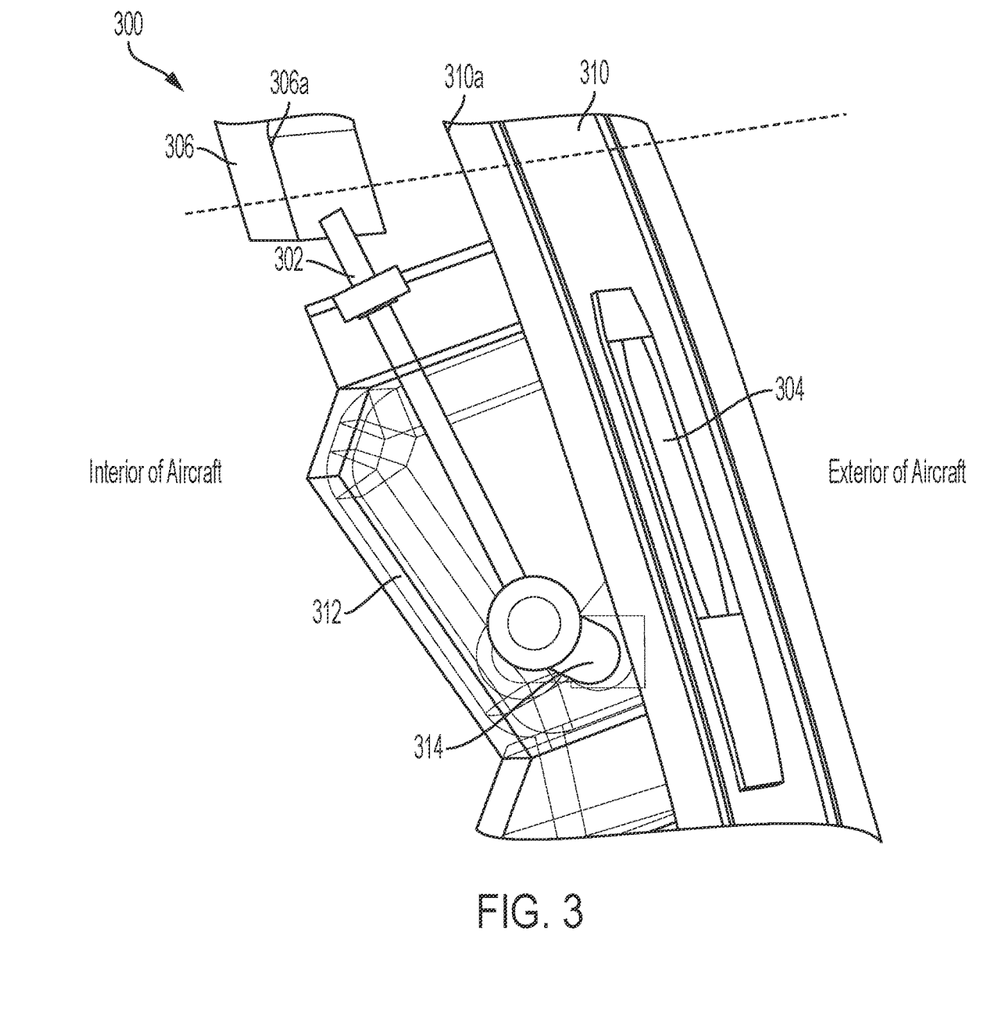
FIG. 3 is an illustration of an example of a first side view of an integral vent panel and outer handle.

FIG. 3 illustrates a first side view of a latching, locking, handle, and pressure prevention system 300 A first protrusion 302 is configured to abut a door structure 306. An outer handle flap 304 is illustrated. The outer handle flap 304 may be readily substituted for outer handle flap 206 (FIG. 2). An outer handle shaft/crank 314 of the outer handle is further illustrated. As the outer handle flap 304 is pushed, the shaft/crank 314 may be caused to rotate and move causing the first protrusion 302 to move. As illustrated, a vent panel 312 is configured to slide along a wall surface 310a of the door 310 (e.g., a wall), and the first protrusion 302 is configured to abut a door surface 306a of the door structure 306, where the wall surface 310a is parallel to the door surface 306a.

Figure 4A:
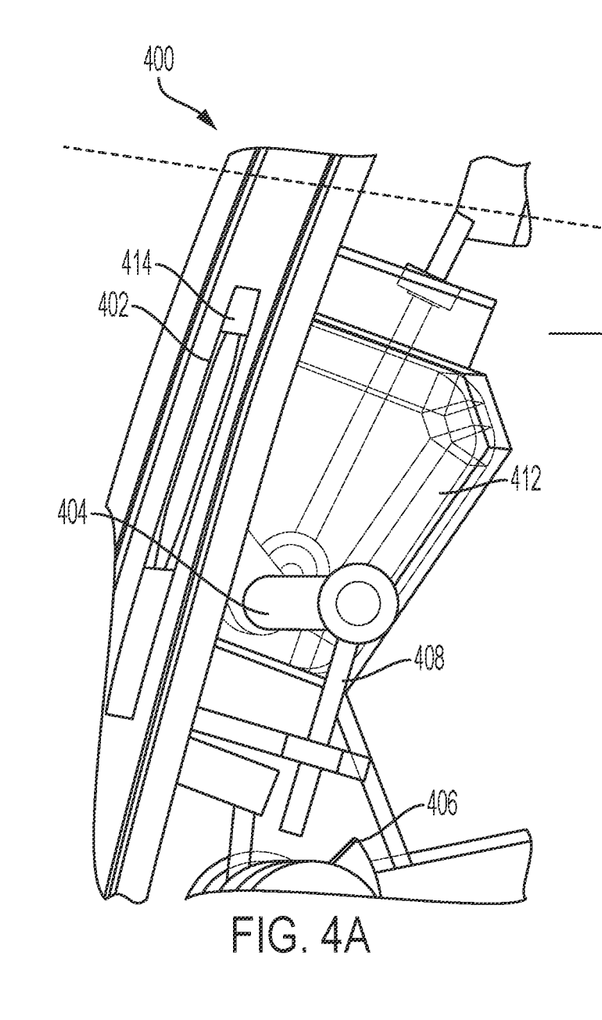
FIGS. 4A and 4B are illustrations of an example of a second side view of a latching locking handle and pressure prevention system as a vent panel moves into a depressurization position.
Figure 4B:
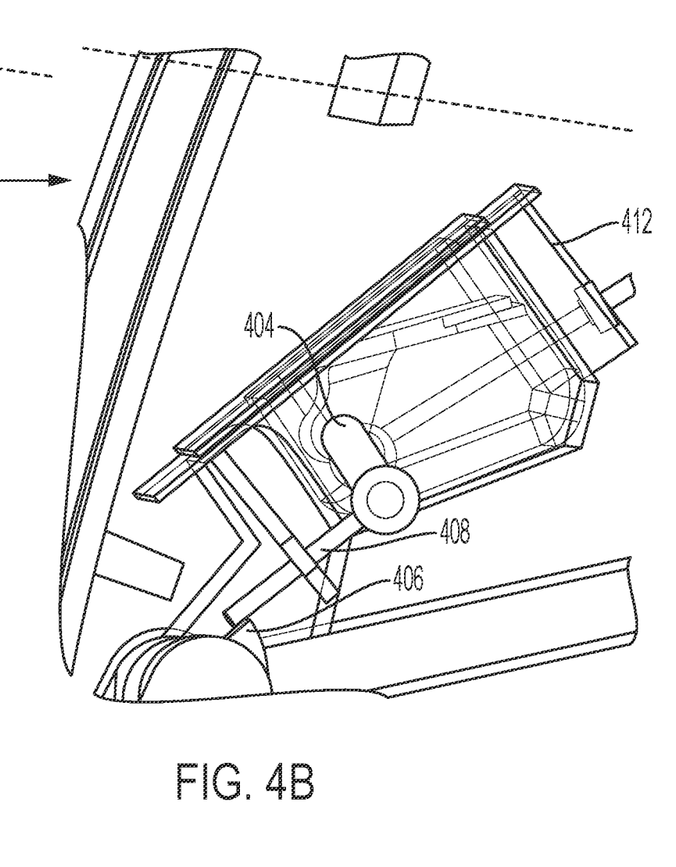

FIGS. 4A-4B illustrates a second side view of a latching, locking, handle, and pressure prevention system 400 as a vent panel 412 moves into a depressurization position. The second side may be opposite the first side view mentioned above with respect to FIG. 3. FIG. 4A shows the pressurization position, and FIG. 4B shows the depressurization position where the depressurization vent (not illustrated) is opened. An outer handle flap 402, such as outer handle flap 304 (FIG. 3), and/or outer handle flap 206 (FIG. 2) of a shaft, such as a shaft of the handle 106 (FIG. 1), is illustrated. The outer handle flap 402 is coupled with a portion 414 of the vent panel 412 that forms an exterior wall of the aircraft. The outer handle flap 402 is coupled with an outer handle shaft/crank 404. A second protrusion 408 is connected with the outer handle shaft/crank 404. The second protrusion 408 engages with an inner handle interface feature 406 as shown in FIG. 4B to rotate the handle 106 about an axis formed at an intersection of the second protrusion 408 and the inner handle interface feature 406 to move the vent panel 412 into the depressurization position.

Thus, the vent panel 412 moves inward and away from the depressurization vent, causing the second protrusion 408 to abut the inner handle interface feature 406. The second protrusion 408 is fastened to the vent panel 412 such that the second protrusion 408 is not movable relate to the vent panel 412. Thus, when the second protrusion 408 abuts the inner handle interface feature 406, the vent panel 412 will cause the handle 106 to rotate unlocking and unlatching the door.

Figure 5A:
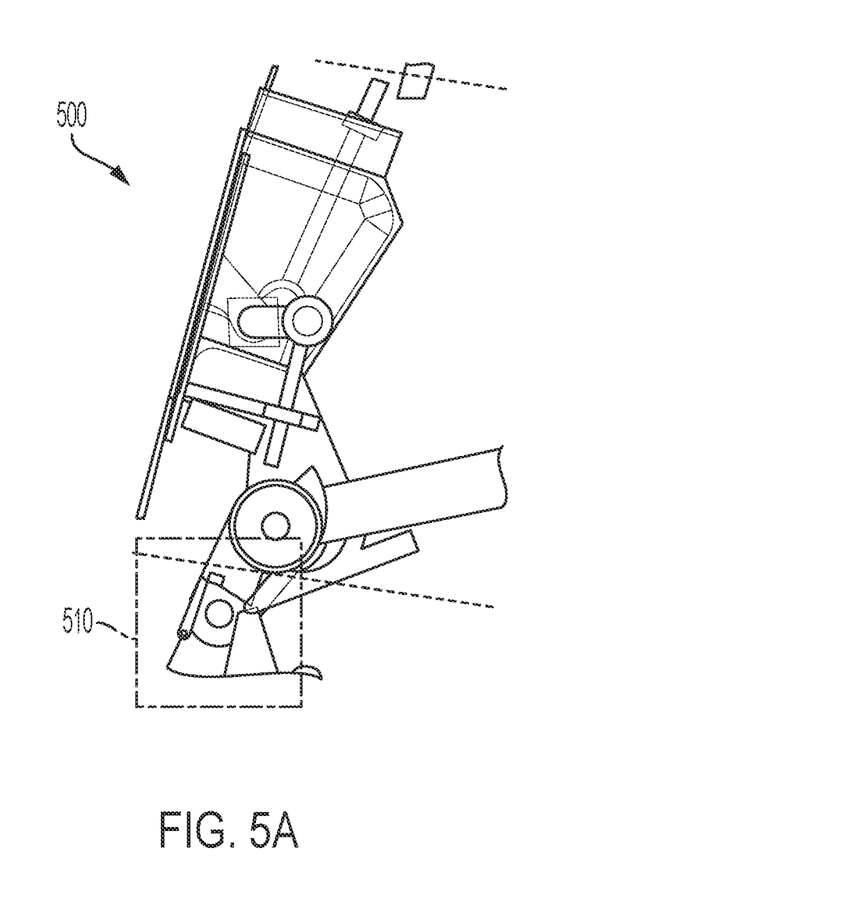
FIG. 5A is an illustration of an example of a latching, locking, handle, and pressure prevention system.
Figure 5B:
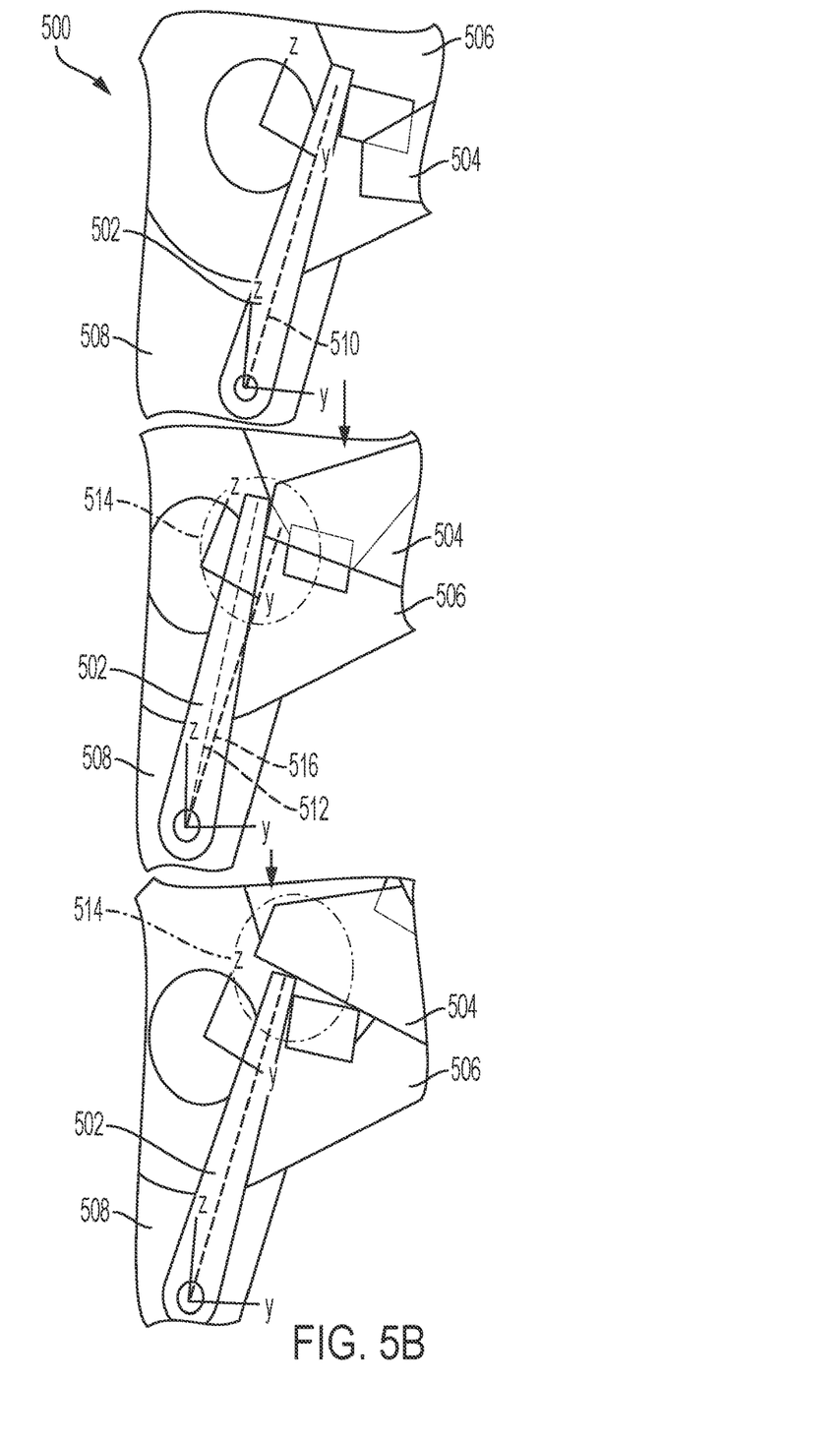
FIG. 5B is an illustration of an example of a portion of the latching, locking, handle, and pressure prevention system in further detail.

FIG. 5A illustrates a latching, locking, handle, and pressure prevention system 500 during an opening process. FIG. 5B illustrates portion 510 (FIG. 5A) in further detail as the pressure prevention system 500 is opened from a pressurization position to a depressurization position. In FIG. 5B, initially (top picture) a handle 506 is pulled down and a vent panel opens. A vent feature 504 may be part of the vent panel. Once a first protrusion clears a door structure, the vent panel springs drive the vent panel open in a rotational fashion to move the vent feature 504 upward while a top part of the vent panel rotates downward. Links 508 further connect the handle 506 to an unshown safety latch.

The vent feature 504 of the vent panel pushes past an interlock 502 as shown at positions 514. The vent feature 504 is a spring loaded feature preventing vent panel closure. A first dashed line 516 is an original position of a central axis of the interlock 502, and a second dashed line 512 shows the interlock 502 rotating as vent feature 504 pushes the interlock 502 (middle picture). Once the vent feature 504 clears the interlock 502, the vent panel is locked in the open position, an interlock spring returns the interlock 502 to the original position as shown in the bottom image of FIG. 5B. The vent panel closing interlock 118 (FIG. 1) can be operated and formed similarly (e.g., identically) to as described above with respect to the interlock 502. In FIG. 5B, the closing order is set so a user cannot close the depressurization vent with the vent panel until an aircraft door is closed and locked. With limited handle rotation it can be difficult to do a significant amount of functions automatically when operating the handle 506. Only when the safety latch (not illustrated in this figure) is locked can a user close the vent panel and have the vent panel stay closed.

Figure 6A:
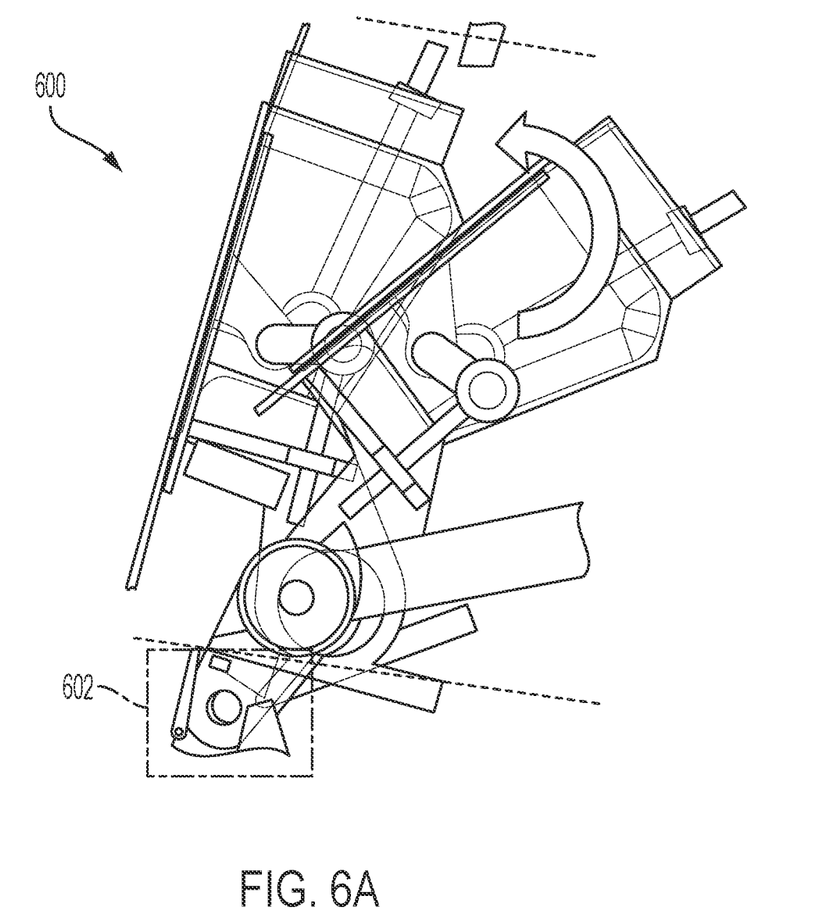
FIG. 6A is an illustration of an example of a latching, locking, handle, and pressure prevention system as the system is moved from a pressure prevention position to a pressurization position.
Figure 6B:
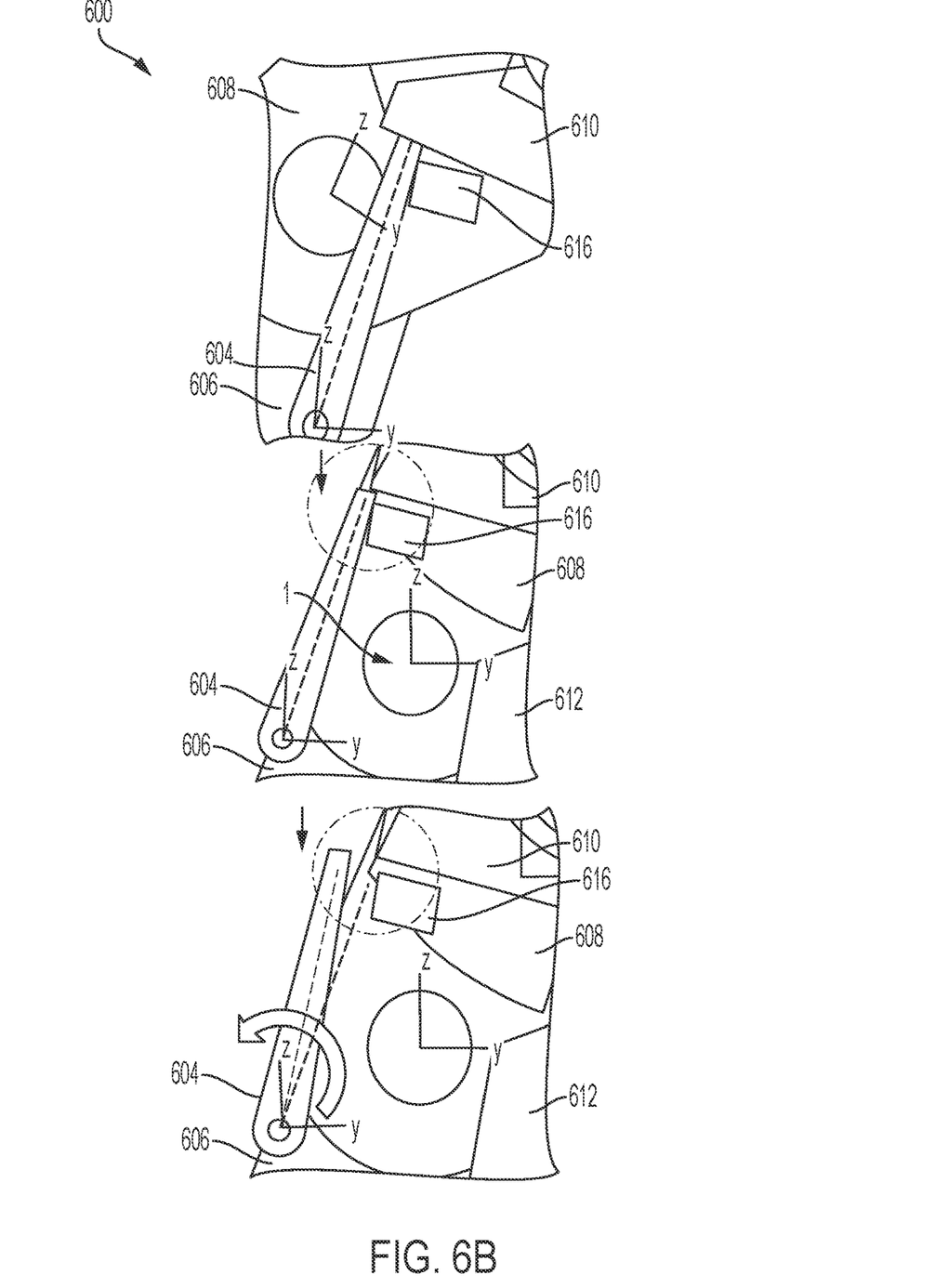
FIG. 6B is an illustration of an example of a portion of the latching, locking, handle, and pressure prevention system in further detail.

FIG. 6A illustrates a latching, locking, handle, and pressure prevention system 600 as the system is moved from a depressurization position to a pressurization position (e.g., is closed). FIG. 6B illustrates portion 602 in further detail as the pressurization prevention system 600 is closed from the depressurization to the pressurization position. FIGS. 6A-6B is generally implemented by any of the examples described herein, for example, the aircraft door 100 (FIGS. 1 and 2), the latching, locking, handle, and pressure prevention system 300 (FIG. 3), the latching, locking, handle, and pressure prevention system 400 (FIGS. 4A-4B) and/or latching, locking, handle, and pressure prevention system 500 (FIGS. 5A-5B).

The vent panel closing may execute in two stages. Initially, the handle 608 was opened (e.g., from an interior of the aircraft) causing the vent panel to open to the depressurization position, and an interlock 604, which is similar to the vent feature 504 (FIG. 5B), is engaged with a vent feature 610 of a vent panel. The top picture shows the vent panel open. The handle 608 begins closing and the interlock 604 is still engaged (middle picture). Links 606 further connect the handle 608 to safety latch 612. Stop 616 is a stop to limit the position on the interlock 604.

The inner handle coordinate system is shown in FIG. 6B. As shown in the bottom image of FIG. 6B, the interlock 604 is pushed outboard following the arrow (may be manually executed), clearing the vent feature 610 of the vent panel. The vent panel is now free to be pushed to the pressurization position. The vent feature 610 is in an open position in FIG. 6B but can be moved to the pressurization position to maintain the interlock 604 outboard relative to the vent feature 610. In this example, the vent panel cannot be closed prior to latching, locking, and closing the handle 608.

Figure 7:
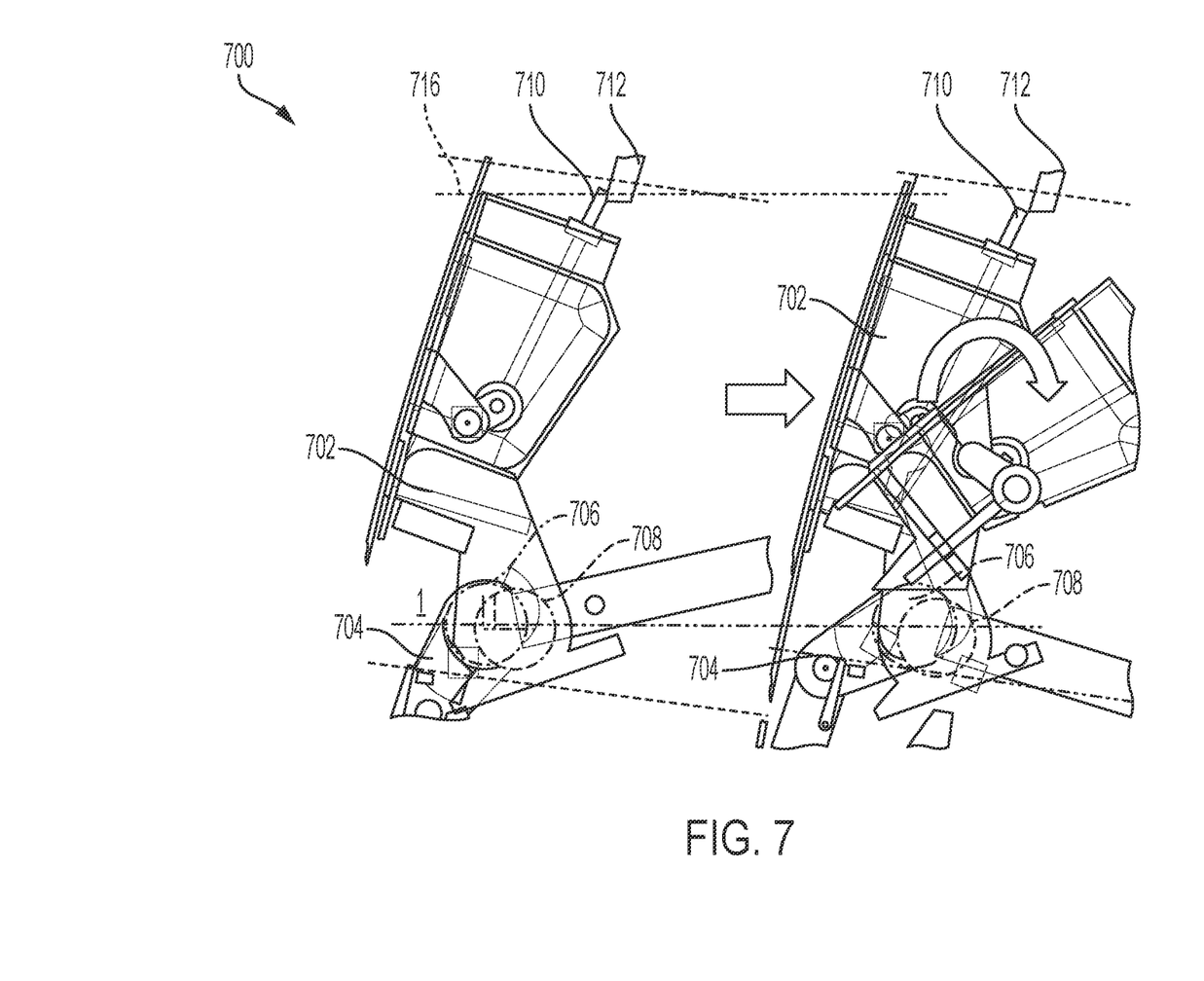
FIG. 7 is an illustration of an example of a latching, locking, handle, and pressure prevention system being moved into a pressure prevention position.

FIG. 7 illustrates a latching, locking, handle, and pressure prevention system 700 being moved into a depressurization position. The latching, locking, handle, and pressure prevention system 700 is generally implemented by any of the examples described herein, for example, the aircraft door 100 (FIGS. 1 and 2), the latching, locking, handle, and pressure prevention system 300 (FIG. 3), the latching, locking, handle, and pressure prevention system 400 (FIGS. 4A-4B), latching, locking, handle, and pressure prevention system 500 (FIGS. 5A-5B) and/or latching, locking, handle, and pressure prevention system 600 (FIGS. 6A-6B).

Initially, a handle 704 (e.g., inner handle) is pulled downward. An eccentric interface at rotational axis 708 between vent panel 702 and a shaft of the handle 704 pulls the vent panel 702 down. The first circle for the rotational axis 708 is the movement of an axis of rotation of the vent panel 702 along an eccentric path about a rotational axis 706 of the handle. Doing so may slide the vent panel 702 along a wall of the door.

The handle 704 may rotate about the rotational axis 706 to move the vent panel 702 downward and eventually rotate the vent panel 702 as shown by the rotational arrow on the right figure. The vent panel 702 may rotate about the rotational axis 708 when a first protrusion 710 moves out of contact with a door structure 712. As illustrated, the vent panel 702 may move into the dashed line position by rotating about the rotational axis 708. The above vent panel motion will shear any ice preventing the vent panel 702 from opening. The vent panel 702 has moved down from the dashed line 716 and the protrusion 710 has also cleared the door structure 712 when the vent panel 702 is able to be rotated.

Figure 8:
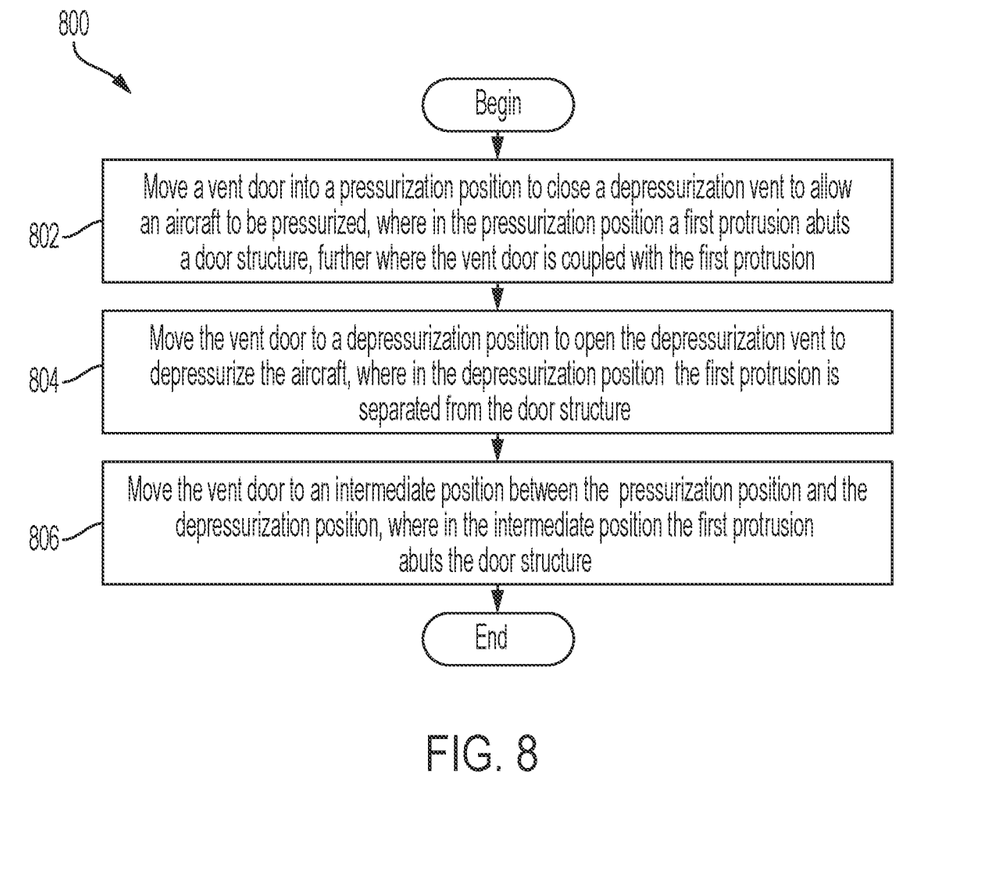
FIG. 8 is an illustration of an example of a method of pressure prevention and depressurization of an aircraft.

FIG. 8 shows a method 800 of controlling pressurization and depressurization of an aircraft. The method 800 is generally implemented by any of the examples described herein, for example, the aircraft door 100 (FIGS. 1 and 2), the latching, locking, handle, and pressure prevention system 300 (FIG. 3), the latching, locking, handle, and pressure prevention system 400 (FIGS. 4A-4B), latching, locking, handle, and pressure prevention system 500 (FIGS. 5A-5B), latching, locking, handle, and pressure prevention system 600 (FIGS. 6A-6B) and/or pressurization prevention system 700 (FIG. 7).

Illustrated processing block 802 moves a vent panel into a pressurization position to close a depressurization vent to allow an aircraft to be pressurized, where in the pressurization position a first protrusion abuts a door structure, wherein the vent panel is coupled with the first protrusion. Illustrated processing block 804 moves the vent panel to a depressurization position to open the depressurization vent to depressurize the aircraft, where in the depressurization position the first protrusion is separated from the door structure. Illustrated processing block 806 moves the vent panel to an intermediate position between the pressurization position and the depressurization position, where in the intermediate position the first protrusion abuts the door structure.

In some examples, the intermediate position includes intermediate positions, and the method 800 further comprises sliding the vent panel along a wall when moving between the intermediate positions. In some examples, the method 800 further includes sliding the vent panel along a wall surface of the wall, and abutting the first protrusion against a door surface of the door structure, where the wall surface is parallel to the door surface. In some examples, the method 800 further includes moving a handle coupled with the vent panel to control the vent panel to move between the pressurization position, the depressurization position and the intermediate position.

In some examples, the intermediate position includes a plurality of intermediate positions, and the method 800 further includes moving a rotational axis of the vent panel along an eccentric rotation when moving the vent panel among the plurality of intermediate positions. In such examples, the method 800 further includes moving a second protrusion coupled with the vent panel to a position to abut a portion of the handle when the vent panel moves from the pressurization position to the depressurization position.

In some examples, the method 800 further includes preventing, with the first protrusion, the vent panel from moving from the intermediate position to the depressurization position when the first protrusion abuts the door structure, and moving, when the first protrusion moves out of an abutment position with the door structure, the vent panel from the intermediate position to the depressurization position. In some examples, the method 800 further includes contacting the vent panel with a vent panel closing interlock that rotates from a first position to a second position as the vent panel moves from the intermediate position to the depressurization position and rotates the vent panel closing interlock from the second position to the first position when the vent panel is in the depressurization position to lock the vent panel in the depressurization position. In some examples, a portion of the vent panel forms an exterior wall of the aircraft. In some examples, a door structure overhangs the vent panel.

Further, the disclosure comprises additional examples as detailed in the following clauses below.

Clause 1. An apparatus (122) comprising:
a door structure (112, 306, 712); and
a first protrusion (110, 302, 710) that is positionable to abut the door structure (112, 306, 712); and
a vent panel (114, 312, 412, 702) coupled with the first protrusion (110, 302, 710), wherein the vent panel (114, 312, 412, 702) is movable between
a pressurization position to close a depressurization vent to allow the apparatus (122) to be pressurized, wherein in the pressurization position the first protrusion (110, 302, 710) abuts the door structure (112, 306, 712),
a depressurization position to open the depressurization vent to prevent pressurization of the apparatus (122), wherein in the depressurization position the first protrusion (110, 302, 710) is separated from the door structure (112, 306, 712), and
an intermediate position between the pressurization position and the depressurization position, wherein in the intermediate position the first protrusion (110, 302, 710) abuts the door structure (112, 306, 712).

Clause 2. The apparatus (122) of clause 1, further comprising a wall (210, 310), wherein the intermediate position includes intermediate positions and the vent panel (114, 312, 412, 702) is configured to slide along the wall (210, 310) when moving between the intermediate positions.

Clause 3. The apparatus (122) of clause 2, wherein the vent panel (114, 312, 412, 702) is configured to slide along a wall surface (310*a*) of the wall (310), and the first protrusion (110, 302, 710) is configured to abut a door surface (306*a*) of the door structure (112, 306, 712), wherein the wall surface (310*a*) is parallel to the door surface (306*a*).

Clause 4. The apparatus (122) of clause 1, further comprising a handle (106) that is coupled with the vent panel (114, 312, 412, 702) to control the vent panel (114, 312, 412, 702) to move between the pressurization position, the depressurization position, and the intermediate position.

Clause 5. The apparatus (122) of clause 4, further comprising a second protrusion (108) coupled with the vent panel to be movable into a position to abut a portion (406) of the handle (112, 306, 712) when the vent panel (114, 312, 412, 702) moves from the pressurization position to the depressurization position.

Clause 6. The apparatus of clause 1, wherein the intermediate position includes a plurality of intermediate positions and a rotational axis (706) of the vent panel (114, 312, 412, 702) has an eccentric rotation when moving the vent panel (114, 312, 412, 702) among the plurality of intermediate positions.

Clause 7. The apparatus (122) of clause 1, wherein:
the first protrusion (110, 302, 710) prevents the vent panel (114, 312, 412, 702) from moving from the intermediate position to the depressurization position when the first protrusion (110, 302, 710) abuts the door structure (112, 306, 712); and
when the first protrusion (110, 302, 710) moves out of an abutment position with the door structure (112, 306, 712), the vent panel (114, 312, 412, 702) is movable from the intermediate position to the depressurization position.

Clause 8. The apparatus (122) of clause 1, further comprising:
a vent panel closing interlock (118) that contacts the vent panel (114, 312, 412, 702) and is rotatable from a first position to a second position as the vent panel (114, 312, 412, 702) moves from the intermediate position to the depressurization position, and is rotatable from the second position to the first position when the vent panel (114, 312, 412, 702) is in the depressurization position to lock the vent panel (114, 312, 412, 702) in the depressurization position.

Clause 9. The apparatus (122) of clause 1, wherein a portion (414) of the vent panel (114, 312, 412, 702) forms an exterior wall of the apparatus (122).

Clause 10. The apparatus (122) of clause 1, wherein the door structure (112, 306, 712) overhangs the vent panel.

Clause 11. A method comprising:
moving a vent panel (114, 312, 412, 702) into a pressurization position to close a depressurization vent to allow an apparatus (122) to be pressurized, wherein in the pressurization position a first protrusion (110, 302, 710) abuts a door structure (112, 306, 712), wherein the vent panel is coupled with the first protrusion (110, 302, 710);
moving the vent panel (114, 312, 412, 702) to a depressurization position to open the depressurization vent to depressurize the apparatus (122), wherein in the depressurization position the first protrusion (110, 302, 710) is separated from the door structure (112, 306, 712); and
moving the vent panel (114, 312, 412, 702) to an intermediate position between the pressurization position and the depressurization position, wherein in the intermediate position the first protrusion (110, 302, 710) abuts the door structure (112, 306, 712).

Clause 12. The method of clause 11, wherein the intermediate position includes intermediate positions, and
the method further comprises sliding the vent panel (114, 312, 412, 702) along a wall (210, 310) when moving between the intermediate positions.

Clause 13. The method of clause 12, wherein further comprising:
sliding the vent panel (114, 312, 412, 702) along a wall surface (310*a*) of the wall (310); and
abutting the first protrusion (110, 302, 710) against a door surface (306*a*) of the door structure (112, 306, 712), wherein the wall surface (310*a*) is parallel to the door surface (306*a*).

Clause 14. The method of clause 11, wherein further comprising:
moving a handle (106) coupled with the vent panel (114, 312, 412, 702) to control the vent panel (114, 312, 412, 702) to move between the pressurization position, the depressurization position, and the intermediate position.

Clause 15. The method of clause 14, further comprising:
moving a second protrusion (108) coupled with the vent panel to a position to abut a portion (406) of the handle (112, 306, 712) when the vent panel (114, 312, 412, 702) moves from the pressurization position to the depressurization position.

Clause 16. The method of clause 11, wherein the intermediate position includes
a plurality of intermediate positions, and
the method further comprises moving a rotational axis (706) of the vent panel (114, 312, 412, 702) along an eccentric rotation when moving the vent panel (114, 312, 412, 702) among the plurality of intermediate positions.

Clause 17. The method of clause 11, wherein:
preventing, with the first protrusion (110, 302, 710), the vent panel (114, 312, 412, 702) from moving from the intermediate position to the depressurization position when the first protrusion (110, 302, 710) abuts the door structure (112, 306, 712); and
moving, when the first protrusion (110, 302, 710) moves out of an abutment position with the door structure (112, 306, 712), the vent panel (114, 312, 412, 702) from the intermediate position to the depressurization position.

Clause 18. The method of clause 11, further comprising:
contacting the vent panel (114, 312, 412, 702) with a vent panel closing interlock (118) that rotates from a first position to a second position as the vent panel (114, 312, 412, 702) moves from the intermediate position to the depressurization position; and
rotating the vent panel closing interlock (118) from the second position to the first position when the vent panel (114, 312, 412, 702) is in the depressurization position to lock the vent panel (114, 312, 412, 702) in the depressurization position.

Clause 19. The method of clause 11, wherein a portion (414) of the vent panel (114, 312, 412, 702) forms an exterior wall of the apparatus (122).

Clause 20. The method of clause 11, further comprising overhanging the door structure (112, 306, 712) over the vent panel (114, 312, 412, 702).

Example sizes/models/values/ranges can have been given, although examples are not limited to the same. Arrangements can be shown in block diagram form in order to avoid obscuring examples, and also in view of the fact that specifics with respect to implementation of such block diagram arrangements are highly dependent upon the computing system within which the example is to be implemented, i.e., such specifics should be well within purview of one skilled in the art. The term "coupled" can be used herein to refer to any type of relationship, direct or indirect, between the components in question, and can apply to electrical, mechanical, fluid, optical, electromagnetic, electromechanical, or other connections. In addition, the terms "first", "second", etc. can be used herein only to facilitate discussion, and carry no particular temporal or chronological significance unless otherwise indicated.

As used in this application and in the claims, a list of items joined by the term "one or more of" can mean any combination of the listed terms. For example, the phrases "one or more of A, B, or C" can mean A; B; C; A and B; A and C; B and C; or A, B, and C.

Those skilled in the art will appreciate from the foregoing description that the broad techniques of the examples can be implemented in a variety of forms. Therefore, while the examples have been described in connection with particular examples thereof, the true scope of the examples should not be so limited since other modifications will become apparent to the skilled practitioner upon a study of the drawings, specification, and following claims.

We claim:

1. An apparatus comprising:
   a door structure; and
   a first protrusion that is positionable to abut the door structure; and
   a vent panel coupled with the first protrusion, wherein the vent panel is movable between
      a pressurization position to close a depressurization vent to allow the apparatus to be pressurized, wherein in the pressurization position the first protrusion abuts the door structure,
      a depressurization position to open the depressurization vent to prevent pressurization of the apparatus, wherein in the depressurization position the first protrusion is separated from the door structure, and
      an intermediate position between the pressurization position and the depressurization position, wherein in the intermediate position the first protrusion abuts the door structure,
      wherein the first protrusion prevents the vent panel from moving from the intermediate position to the depressurization position when the first protrusion abuts the door structure.

2. The apparatus of claim 1, further comprising a wall, wherein the intermediate position includes intermediate positions, and the vent panel is configured to slide along the wall when moving between the intermediate positions.

3. The apparatus of claim 2, wherein the vent panel is configured to slide along a wall surface of the wall, and the first protrusion is configured to abut a door surface of the door structure, wherein the wall surface is parallel to the door surface.

4. The apparatus of claim 1, further comprising a handle that is coupled with the vent panel to control the vent panel to move between the pressurization position, the depressurization position, and the intermediate position.

5. The apparatus of claim 1, wherein the intermediate position includes a plurality of intermediate positions and a rotational axis of the vent panel has an eccentric rotation when moving the vent panel among the plurality of intermediate positions.

6. The apparatus of claim 1, wherein:
   when the first protrusion moves out of an abutment position with the door structure, the vent panel is movable from the intermediate position to the depressurization position.

7. The apparatus of claim 1, further comprising:
   a vent panel closing interlock that contacts the vent panel and is rotatable from a first position to a second position as the vent panel moves from the intermediate position to the depressurization position, and is rotatable from the second position to the first position when the vent panel is in the depressurization position to lock the vent panel in the depressurization position.

8. The apparatus of claim 1, wherein a portion of the vent panel forms an exterior wall of the apparatus.

9. The apparatus of claim 1, wherein the door structure overhangs the vent panel.

10. An apparatus comprising:
    a door structure;
    a first protrusion that is positionable to abut the door structure;
    a vent panel coupled with the first protrusion, wherein the vent panel is movable between
       a pressurization position to close a depressurization vent to allow the apparatus to be pressurized, wherein in the pressurization position the first protrusion abuts the door structure,
       a depressurization position to open the depressurization vent to prevent pressurization of the apparatus, wherein in the depressurization position the first protrusion is separated from the door structure, and
       an intermediate position between the pressurization position and the depressurization position, wherein in the intermediate position the first protrusion abuts the door structure;
    a handle that is coupled with the vent panel to control the vent panel to move between the pressurization position, the depressurization position, and the intermediate position; and
    a second protrusion coupled with the vent panel to be movable into a position to abut a portion of the handle when the vent panel moves from the pressurization position to the depressurization position.

11. A method comprising:
    moving a vent panel into a pressurization position to close a depressurization vent to allow an apparatus to be pressurized, wherein in the pressurization position a first protrusion abuts a door structure, wherein the vent panel is coupled with the first protrusion;
    moving the vent panel to a depressurization position to open the depressurization vent to depressurize the apparatus, wherein in the depressurization position the first protrusion is separated from the door structure;
    moving the vent panel to an intermediate position between the pressurization position and the depressurization position, wherein in the intermediate position the first protrusion abuts the door structure; and preventing, with the first protrusion, the vent panel from moving from the intermediate position to the depressurization position when the first protrusion abuts the door structure.

12. The method of claim 11, wherein the intermediate position includes intermediate positions, and the method further comprises sliding the vent panel along a wall when moving between the intermediate positions.

13. The method of claim 12, wherein further comprising:
sliding the vent panel along a wall surface of the wall; and
abutting the first protrusion against a door surface of the door structure, wherein the wall surface is parallel to the door surface.

14. The method of claim 11, wherein further comprising:
moving a handle coupled with the vent panel to control the vent panel to move between the pressurization position, the depressurization position, and the intermediate position.

15. The method of claim 14, further comprising:
moving a second protrusion coupled with the vent panel to a position to abut a portion of the handle when the vent panel moves from the pressurization position to the depressurization position.

16. The method of claim 11, wherein the intermediate position includes a plurality of intermediate positions, and the method further comprises moving a rotational axis of the vent panel along an eccentric rotation when moving the vent panel among the plurality of intermediate positions.

17. The method of claim 11, further comprising:
moving, when the first protrusion moves out of an abutment position with the door structure, the vent panel from the intermediate position to the depressurization position.

18. The method of claim 11, further comprising:
contacting the vent panel with a vent panel closing interlock that rotates from a first position to a second position as the vent panel moves from the intermediate position to the depressurization position; and
rotating the vent panel closing interlock from the second position to the first position when the vent panel is in the depressurization position to lock the vent panel in the depressurization position.

19. The method of claim 11, wherein a portion of the vent panel forms an exterior wall of an apparatus.

20. The method of claim 11, further comprising overhanging the door structure over the vent panel.

* * * * *